(12) United States Patent
Koike et al.

(10) Patent No.: US 6,479,911 B1
(45) Date of Patent: Nov. 12, 2002

(54) PM TYPE STEPPING MOTOR

(75) Inventors: Yoshikazu Koike, Chino (JP); Akihiko Ikegami, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/657,364

(22) Filed: Sep. 7, 2000

(30) Foreign Application Priority Data

Sep. 22, 1999 (JP) ............................................. 11-269393
May 22, 2000 (JP) ......................................... 2000-149715

(51) Int. Cl.$^7$ ............................................... H02K 37/00
(52) U.S. Cl. ...................... 310/49 R; 310/257; 310/269
(58) Field of Search ............................ 310/49 R, 254, 310/257, 258, 43, 269, 265, 90

(56) References Cited

U.S. PATENT DOCUMENTS

| | | | |
|---|---|---|---|
| 4,672,247 A | * 6/1987 | Madsen et al. | 310/49 R |
| 4,794,292 A | * 12/1988 | Torisawa | 310/257 |
| 4,990,806 A | * 2/1991 | Kikuchi et al. | 310/49 A |
| 5,132,603 A | * 7/1992 | Yoshimoto | 318/696 |
| 5,283,487 A | * 2/1994 | Oki et al. | 310/49 R |
| 5,291,084 A | 3/1994 | Shiotsuki et al. | |
| 5,648,692 A | * 7/1997 | Watanabe et al. | 310/49 R |
| 5,854,526 A | * 12/1998 | Sakamoto | 310/254 |
| 6,208,047 B1 | * 3/2001 | Agematsu et al. | 310/49 R |

FOREIGN PATENT DOCUMENTS

| JP | 03007050 A | 1/1991 |
|---|---|---|
| JP | 05252719 | 9/1993 |
| JP | 08126290 | 5/1996 |
| JP | 09233802 | 9/1997 |
| JP | 10136631 | 5/1998 |

* cited by examiner

Primary Examiner—Thomas M. Dougherty
Assistant Examiner—Thanh Lam
(74) Attorney, Agent, or Firm—Oliff & Berridge, PLC

(57) ABSTRACT

A PM type stepping motor is provided capable of further reducing the higher harmonic component of detent torque. n sets of teeth groups, each consisting of m stator polar teeth, are set for each of an outer yoke and an inner yoke, and the pitch P2 of the stator polar teeth, the pitch P3 of the teeth groups, and the pitch P1 of the N and S poles of permanent magnets are set such that the relationship: $P2 \ne P1$, $P3 \ne m \cdot P1$, and $P3 \ne m \cdot P2$ holds true, where P1, P2 and P3 are electrical angles, and m and n are integers equal to or larger than 2.

18 Claims, 14 Drawing Sheets

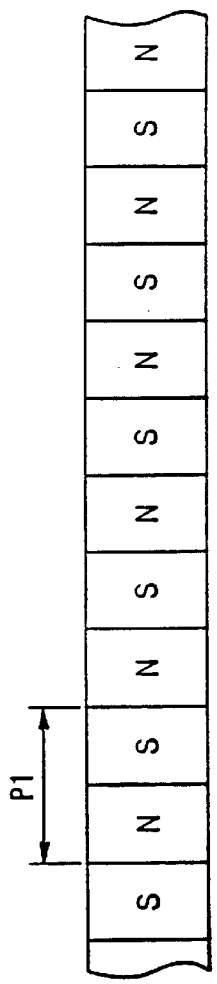
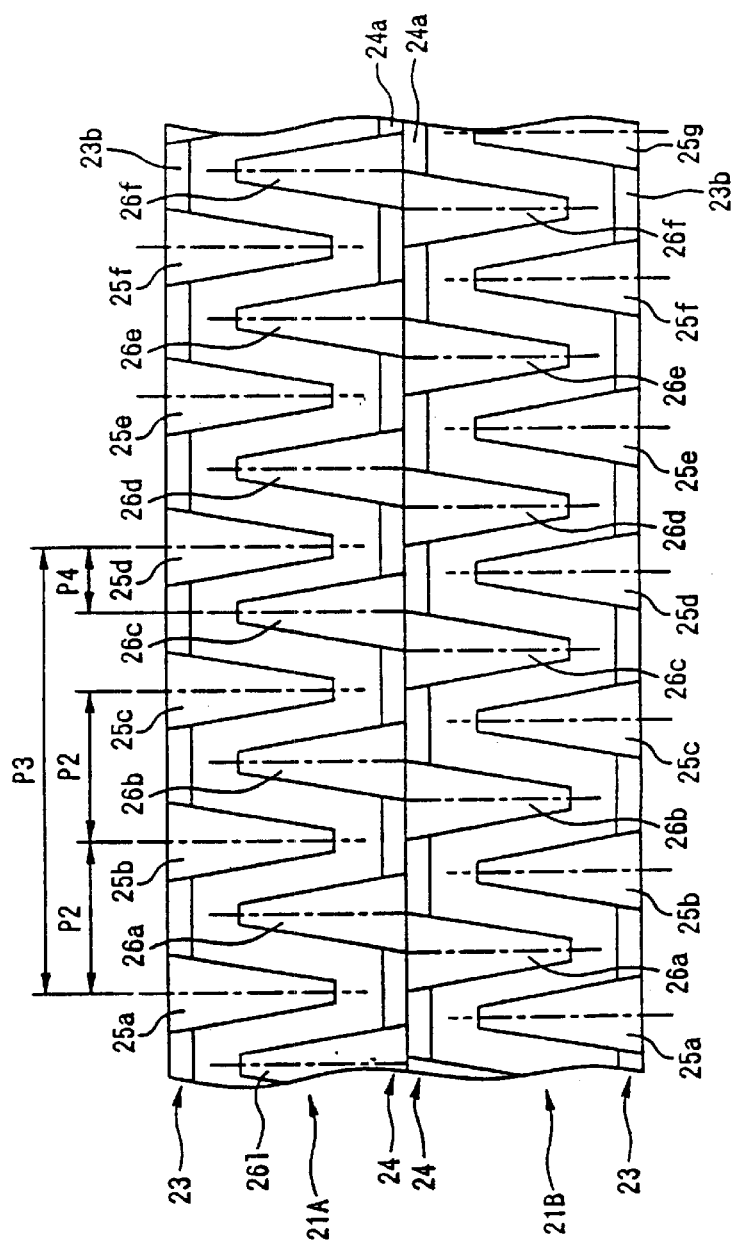
FIG. 2(a)
FIG. 2(b)

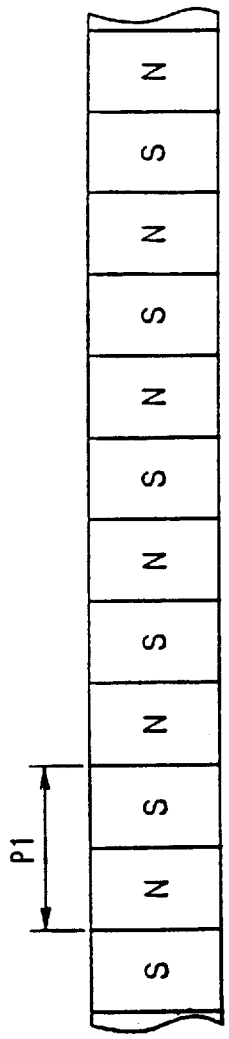
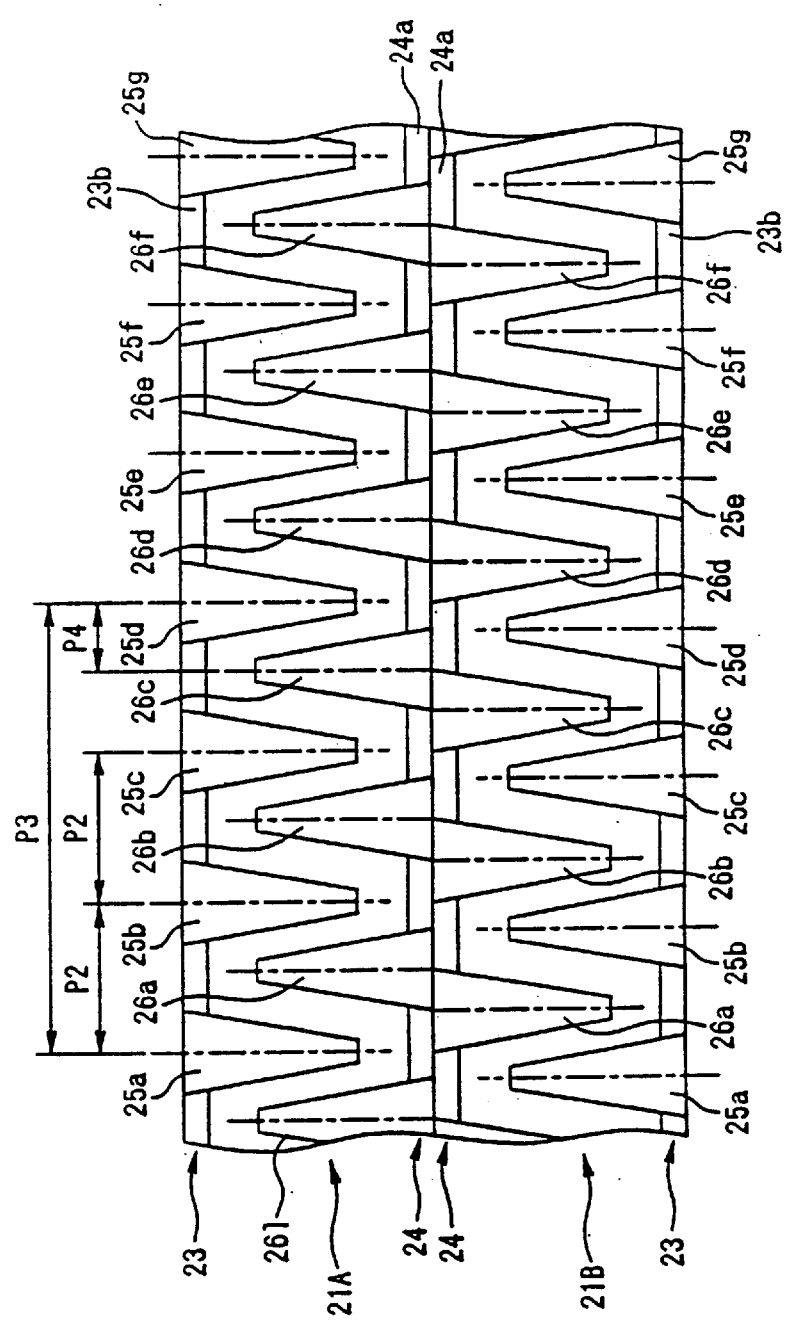
FIG. 6(a)
FIG. 6(b)

PM TYPE STEPPING MOTOR

BACKGROUND OF THE INVENTION

1. Field of Invention

The present invention relates to a PM type stepping motor, and more specifically, it relates to a PM type stepping motor capable of further reducing vibration and noise.

2. Description of Related Art

A conventional PM type stepping motor proposed by the present applicant is disclosed in Japanese Unexamined Patent Application Publication No. 10-136631. In this conventional PM type stepping motor, to effectively reduce the higher harmonic component of the detent torque, the polar teeth of the yokes of the stator unit are arranged so as to be deviated from positions at equal intervals. That is, when the polar teeth are shifted from positions of equal intervals, the higher harmonic component of the detent torque appearing in principle can be canceled out in the yokes and reduced.

Other conventional PM type stepping motors are disclosed in Japanese Unexamined Patent Application Publication No. 5-252719, Japanese Unexamined Patent Application Publication No. 8-126290, Japanese Unexamined Patent Application Publication No. 3-7050, Japanese Unexamined Patent Application Publication No. 9-233802, etc.

Of these, Japanese Unexamined Patent Application Publication No. 5-252719 discloses a two-phase PM type stepping motor in which a member consisting of a non-magnetic material is provided between first and second phases stacked together in the axial direction.

Japanese Unexamined Patent Application Publication No. 8-126290 discloses a method of joining yokes constituting the stator of a PM type stepping motor.

Japanese Unexamined Patent Application Publication No. 3-7050 discloses a PM type stepping motor in which adjacent polar teeth of the yoke are connected by a bridge.

Further, Japanese Unexamined Patent Application Publication No. 9-233802 discloses a PM type stepping motor which is equipped with a plate spring biasing the rotation shaft of the rotor in one axial direction.

SUMMARY OF THE INVENTION

In the PM type stepping motor disclosed in Japanese Unexamined Patent Application Publication No. 10-136631, it is true that, for example, the fourth degree higher harmonic component of the detent torque, can be reduced. However, there is no possibility of both the fourth degree higher harmonic and the second degree higher harmonic being reduced. Further, in some parts, the gap between the polar teeth of the outer yoke and the polar teeth of the inner yoke is extremely small, so that the leakage flux flowing between those polar teeth increases, resulting in a reduction in the torque generated.

On the other hand, careful study made by the present inventors shows that in a PM type stepping motor, the vibration and noise attributable to the axial vibration of the polar teeth due to the electromagnetic force when the motor is driven are not negligible, apart from the vibration and noise attributable to the higher harmonic component of the detent torque periodically generated with respect to the rotation angle of the rotor due to the magneto motive force of the permanent magnet, as has been conventionally reported. However, in the PM type stepping motor disclosed in Japanese Unexamined Patent Application Publication No. 10-136631, nothing is done to reduce the noise such as impact sound attributable to the axial vibration of the polar teeth.

In the PM type stepping motor disclosed in Japanese Unexamined Patent Application Publication No. 5-252719, it is possible to prevent direct collision of the first phase and second phase polar teeth by means of the member provided between the phases. However, exclusively aiming at a reduction in detent torque, the technique does not adopt a construction in which collision of the member interposed between the phases with the polar teeth, and the sound caused by the collision of the member with the polar teeth has resulted in an increase in noise.

In the PM type stepping motor disclosed in Japanese Unexamined Patent Application Publication No. 8-126290, there is provided no joining method as will prevent collision of the motor cover with the polar teeth, and the sound caused by the collision of the cover with the polar teeth has resulted in an increase in noise.

In contrast, in the PM type stepping motor disclosed in Japanese Unexamined Patent Application Publication No. 3-7050, the strength of the base portions of the polar teeth is increased, so that a reduction in the vibration of the polar teeth due to the electromagnetic force when driving the motor can be expected. However, since it adopts a construction in which a bridge is provided, the number of parts is rather large, resulting in an increase in production cost.

Further, in the PM type stepping motor disclosed in Japanese Unexamined Patent Application Publication No. 9-233802, when the reaction force of the electromagnetic force causing the axial vibration of the polar teeth when driving the motor acts on the rotor side, the rotor also axially vibrates, involving elastic deformation of the plate spring and colliding with a member such as the bearing when displaced in the same direction as the biasing direction of the plate spring to thereby generate an impact sound.

The present invention has been made in view of the problems in the conventional techniques. It is one object of the present invention to provide a PM type stepping motor capable of further reducing the higher harmonic component of the detent torque and, further, to provide a PM type stepping motor capable of reducing the noise attributable to the axial vibration of the polar teeth and the rotation shaft due to the electromagnetic force when driving the motor.

According to one exemplary embodiment of the present invention, a PM type stepping motor may consist of a rotor in which N and S magnetic pole pairs of permanent magnets are alternately arranged circumferentially on the outer peripheral surface at a fixed pitch P1, and a stator surrounding the rotor. The stator may consist of a stator unit equipped with an outer yoke and an inner yoke, the outer and inner yokes having comb-teeth-like stator polar teeth in the inner periphery. Each of the outer and inner yokes is equipped with n sets of teeth groups each consisting of m stator polar teeth.

Assuming that the pitch of the stator polar teeth in the teeth group is P2 and the pitch of the teeth groups is P3, $$P2 \neq P1, \tag{1}$$

$$P3 \neq m \cdot P1, \text{ and} \tag{2}$$

$$P3 \neq m \cdot P2 \tag{3},$$

where P1, P2 and P3 are electrical angles, and m and n are integers equal to or larger than 2.

According to another exemplary embodiment of the present invention, in the above PM type stepping motor, the teeth groups of the outer and inner yokes may be set such that an arbitrary one of the teeth groups of the outer yoke overlaps circumferentially only one of the teeth groups of the inner yoke. That is, assuming, for example, that m=3, three polar teeth of an arbitrary teeth group of the outer yoke and three polar teeth of the teeth group of the inner yoke paired therewith are arranged circumferentially as: first of the outer yoke, first of the inner yoke, second of the outer yoke, second of the inner yoke, third of the outer yoke and third of the inner yoke, and do not circumferentially overlap other teeth groups. In the case of a plural phase PM type stepping motor in which a plurality of stator units are stacked together, it suffices that this relationship only holds true in each stator unit.

According to another exemplary embodiment of the present invention, in the above PM type stepping motor, the relationship:

$$P2=P1\ \{1\pm i/u\}, \text{ and} \quad (4)$$

$$P3=P1\ \{m\pm i'/(n\cdot v')\} \quad (5)$$

holds true, where u is a positive integer, i is a positive integer which is not a multiple of u, i' is a positive integer which is not a multiple of n, and v' is the degree of main higher harmonic reduced.

According to another exemplary embodiment of the present invention, in the above PM type stepping motor, the relationship:

$$P2=P1\ \{1-i/u\}, \text{ and} \quad (6)$$

$$P3=P1\ \{m+i'/(n\cdot v')\}, \quad (7)$$

or the relationship:

$$P2=P1\ \{1-i/u\}, \text{ and} \quad (8)$$

$$P3=P1\ \{m-i'/(n\cdot v')\} \quad (9)$$

holds true.

According to another exemplary embodiment of the present invention, in the above PM type stepping motor, the relationship:

$$P2=P1\ \{1\pm i/(m\cdot v)\}, \text{ and} \quad (10)$$

$$P3=P1\ \{m\pm i'/(n\cdot v')\} \quad (11)$$

holds true, where v and v' are degrees of main higher harmonics reduced, i is a positive integer which is not a multiple of m, and i' is a positive integer which is not a multiple of n.

According to another exemplary embodiment of the present invention, in the above PM type stepping motor, the relationship:

$$P2=P1\ \{1-i/(m\cdot v)\}, \text{ and} \quad (12)$$

$$P3=P1\ \{m+i'/(n\cdot v')\} \quad (13)$$

or the relationship:

$$P2=P1\ \{1-i/(m\cdot v)\}, \text{ and} \quad (14)$$

$$P3=P1\ \{m-i'/(n\cdot v')\} \quad (15)$$

holds true.

According to another exemplary embodiment of the present invention, in the above PM type stepping motor, the stator may have a construction in which a plurality of the stator units are stacked together, and an axial gap may be formed between the base portions of the stator polar teeth of the stator units axially adjacent to each other so that the base portions may not come into contact with each other.

According to another exemplary embodiment of the present invention, in the above PM type stepping motor, there may be provided in the outer periphery in the vicinity of the forward end of the stator polar teeth a constraining member formed of a non-magnetic material and for constraining the stator polar teeth.

According to another exemplary embodiment of the present invention, in the above PM type stepping motor, the constraining member is a ring.

According to another exemplary embodiment of the present invention, a PM type stepping motor may consist of a rotor in which N and S magnetic pole pairs of permanent magnets are alternately arranged circumferentially on the outer peripheral surface at a fixed pitch, and a stator surrounding the rotor. The stator may consist of a construction in which a plurality of stator units equipped with outer yokes and inner yokes are stacked together, the outer and inner yokes having comb-teeth-like stator polar teeth in the inner periphery. An axial gap may be formed between base portions of the stator polar teeth of axially adjacent stator units so that the base portions do not come into contact with each other.

According to another exemplary embodiment of the present invention, in the above PM type stepping motor, there may be provided between the stator units axially adjacent to each other a spacer which is in contact with only the portions other than the base portions of the stator polar teeth of the stator units to thereby form the axial gap.

According to another exemplary embodiment of the present invention, in the above PM type stepping motor, the base portions of the stator polar teeth may be deformed so as to be separated from the base portions of the other stator polar teeth axially adjacent thereto to thereby form the axial gap.

Further, according to another exemplary embodiment of the present invention, there is provided a PM type stepping motor which may consist of a rotor in which N and S magnetic pole pairs of permanent magnets are alternately arranged circumferentially on the outer peripheral surface at a fixed pitch, and a stator surrounding the rotor. The stator may consist of a stator unit equipped with outer and inner yokes, the outer and inner yokes having comb-teeth-like stator polar teeth in the inner periphery. There may be provided in the outer periphery in the vicinity of the forward end of the stator polar teeth a constraining member formed of a non-magnetic material and for constraining the stator polar teeth.

According to another exemplary embodiment of the present invention, in the above PM type stepping motor, a constraining member for constraining the stator polar teeth of the outer yoke and a constraining member for constraining the stator polar teeth of the inner yoke may be individually provided.

According to another exemplary embodiment of the present invention, in the above PM type stepping motor, the width of the constraining member is such as to cover from the vicinity of the forward end of the stator polar teeth of the outer yoke to the vicinity of the forward end of the stator polar teeth of the inner yoke.

According to another exemplary embodiment of the present invention, a PM type stepping motor may consist of a rotor in which N and S magnetic pole pairs of permanent magnets are alternately arranged circumferentially on the outer peripheral surface at a fixed pitch, and a stator surrounding the rotor. The stator may have a construction in which a stator unit equipped with outer and inner yokes is inserted between covers from the axial direction, the outer and inner yokes having comb-teeth-like stator polar teeth in the inner periphery. There may be provided a cover collision preventing structure for preventing collision of the stator polar teeth with the cover.

According to another exemplary embodiment of the present invention, in the above PM type stepping motor, the cover collision preventing structure may have a construction in which the base portions of the stator polar teeth in contact with the cover are connected to the cover.

According to the another exemplary embodiment of the present invention, a PM type stepping motor may consist of a rotor in which N and S magnetic pole pairs of permanent magnets are alternately arranged circumferentially on the outer peripheral surface at a fixed pitch, and a stator surrounding the rotor. The stator may have a stator unit equipped with an outer yoke and an inner yoke, the outer and inner yokes having comb-teeth-like stator polar teeth in the inner periphery. Ribs may be integrally formed by press molding at the base portions of the stator polar teeth.

According to another exemplary embodiment of the present invention, a PM type stepping motor may consist of a rotor in which N and S magnetic pole pairs of permanent magnets are alternately arranged circumferentially on the outer peripheral surface at a fixed pitch, and a stator surrounding the rotor. The rotation shaft of the rotor may be rotatably supported by members on the stator side at two positions axially separated from each other. The stator may have a stator unit equipped with an outer yoke and an inner yoke, the outer and inner yokes having comb-teeth-like stator polar teeth in the inner periphery. The two positions axially separated from each other of the rotation shaft of the rotor may be supported by the rotor side members through the intermediation of elastic members capable of elastic deformation in the axial direction.

In one exemplary embodiment of the invention discussed above, as shown in formula (1), the pitch P2 of the stator polar teeth in the teeth group is different from the pitch P1 of the N and S poles polarized to the rotor, whereby the higher harmonic of the degree corresponding to this deviation is reduced.

It is possible to assume that one teeth group consisting of m stator polar teeth is one polar tooth corresponding to m magnetic pole pairs on the rotor side. Thus, as shown in formula (2), the pitch P3 of the teeth groups is different from the pitch m·P1 of m magnetic pole pairs, so that the higher harmonic of the degree corresponding to this deviation is reduced.

Further, when the pitch P3 of the teeth groups is m times the pitch P2 of the stator polar teeth in the teeth group, the pitch of the stator polar teeth is fixed over a plurality of teeth groups, and the boundary between teeth groups is lost. Thus, as shown in formula (3), the pitch P3 of the teeth group is different from m times the pitch P2 of the stator polar teeth in the teeth group.

In this way, in this above exemplary embodiment of the invention, higher harmonics of more degrees are reduced, so that the higher harmonics are efficiently reduced, thereby providing a more quiet, smooth rotation.

Further, generally speaking, it is known that when the relationship:

$$PS=PR\ \{1\pm 1/(m\cdot v)\} \qquad (16)$$

holds true between the rotor magnetic pole pitch PR and the stator polar teeth pitch PS, it is possible to reduce a plurality of higher harmonic components including the detent torque v-th degree.

The higher harmonic of each degree is represented by a sine wave of a predetermined period, so that the deviation in stator polar teeth as shown in formula (16) may be i times PR $\{1/(m\cdot v)\}$ (I is a positive integer which is not a multiple of m), that is, PR $\{i/(m\cdot v)\}$.

In one exemplary embodiment of the invention discussed above, the pitch P2 of the stator polar teeth in the teeth group is as shown in formula (10), it is possible to reduce a plurality of higher harmonic components including the v-th degree. Further, when the relationship of the pitch P3 of the teeth group and the pitch P1 of the magnetic pole pairs on the rotor side is $$P3=m\cdot P1\ \{1\pm i'/(n\cdot v')\} \qquad (17),$$

a plurality of higher harmonics including the v-th degree are reduced. However, since the higher harmonics generated in the teeth group can be decomposed for m rotor polar teeth, the deviation in pitch of the teeth group with respect to the m magnetic pole pairs on the rotor side may be (1/m).

Thus, from the above formula (17), $$P3=m\cdot P1\ \{1\pm i'/(n\cdot v'\cdot m)\}=P1\ \{1\pm i'/(n\cdot v')\},$$

the above formula (11) is obtained. Accordingly, in this above exemplary embodiment of the present invention, the pitch P3 of the teeth groups is as shown in the above formula (11), so that it is possible to also reduce a plurality of higher harmonics including the v'-th degree.

Further, in one exemplary embodiment of the invention discussed above, assuming that m·v=u (u is a positive integer) and that i is a positive integer which is not a multiple of u, formula (4) is obtained from formula (10), and the pitch P3 of the teeth groups is as shown in formula (5) (which is the same as formula (11), so that it is possible to reduce a plurality of higher harmonics including the v'-th degree.

Further, in one exemplary embodiment of the invention discussed above, the "±" of the right side of formulas (4) and (5) in this above exemplary embodiment is replaced by a combination of "−" and "+" (formulas (6) and (7)) or a combination of "−" and "−" (formulas (8) and (9)), and in another exemplary embodiment, the "±" of the right side of formulas (10) and (11) in yet another exemplary embodiment of the invention is replaced by a combination of "−" and "+" (formulas (12) and (13)) or a combination of "−" and "−" (formulas (14) and (15)).

When the combination in the above exemplary embodiments of the invention is selected, there is no fear of the gap between the rotor polar teeth becoming extremely small, so that it is possible to prevent an increase in the leakage flux flowing between the rotor polar teeth, making it possible to prevent a great reduction in the torque generated.

In one exemplary embodiment of the invention discussed above, the stator has a construction in which a plurality of stator units are stacked together. However, due to the gap formed between the base portions of the stator polar teeth of adjacent stator units, even if the stator polar teeth vibrate in the axial direction due to the electromagnetic force when driving the motor, it is possible to reduce the fear of the base portions of the stator polar teeth colliding with each other. Such a gap can be easily realized.

Further, in one exemplary embodiment of the invention discussed above, there is provided in the outer periphery in the vicinity of the forward end of the stator polar teeth a constraining member formed of a non-magnetic material and constraining the stator polar teeth, so that if electromagnetic force acts on the stator polar teeth when driving the motor, it is possible to prevent deformation of the stator polar teeth.

It is not absolutely necessary for the constraining member to be provided at the forward end of the stator polar teeth; it may be provided at a position in the vicinity of the forward end, where it is possible to restrain deformation of the stator polar teeth.

Further, as in one exemplary embodiment of the invention discussed above, the constraining member for constraining the stator polar teeth of the outer yoke and the constraining member for constraining the stator polar teeth of the inner yoke may be individually provided, or the width of the constraining member may be such as to cover from the vicinity of the forward end of the stator polar teeth of the outer yoke to the vicinity of the forward end of the stator polar teeth of the inner yoke, thereby reducing the number of parts. Further, in another exemplary embodiment, a ring may be used as the constraining member, wherein this ring is fitted onto the outer periphery of the stator polar tooth, and wherein the wall thickness of the ring is smaller than the distance between the exciting coil opposed to the stator polar tooth when assembled and the stator polar tooth, whereby assembly can be easily conducted even if the ring is attached to the stator polar tooth.

Further, in one exemplary embodiment of the invention discussed above, there is provided a cover collision preventing structure for preventing collision of the base portions of the stator polar teeth with the cover, so that even if the stator polar teeth vibrate in the axial direction due to the electromagnetic force when driving the motor, it is possible to reduce the fear of the base portions of the stator polar teeth colliding with the cover. Such a cover collision preventing structure can be easily realized by joining the base portions of the stator polar teeth in contact with the cover to the cover (e.g., by soldering).

In one exemplary embodiment of the invention discussed above, ribs are integrally formed in the base portions of the stator polar teeth by press molding, so that even if a force to axially vibrate the stator polar teeth is generated due to the electromagnetic force when driving the motor, it is possible to eliminate or minimize the axial vibration of the stator polar teeth. Thus, it is possible to prevent the stator polar teeth from colliding with other members or minimize the impact if the collision does occur. And, since the ribs are solely integrally formed by press molding, it is possible to reduce the cost as compared with the case in which a bridge is formed as a separate member.

Further, in one exemplary embodiment of the invention discussed above, two portions of the rotation shaft of the rotor axially spaced apart from each other are supported by the stator side member (for example, the cover) through the intermediation of elastic members capable of elastic deformation in the axial direction, so that if a reaction force of the force causing axial vibration of the stator polar teeth due to the electromagnetic force when driving the motor is input, it is possible to reduce the possibility of the rotation shaft colliding with the bearing, etc.

BRIEF DESCRIPTION OF THE DRAWINGS

FIGS. 2(A)–(B) are developments illustrating the positional relationship between permanent magnets and stator polar teeth.

FIGS. 6(A)–(B) are developments illustrating the positional relationship of permanent magnets and stator polar teeth in the second exemplary embodiment.

DETAILED DESCRIPTION OF PREFERRED EMBODIMENTS

Exemplary embodiments of the present invention will now be illustrated with reference to the drawings.

Figure 1:
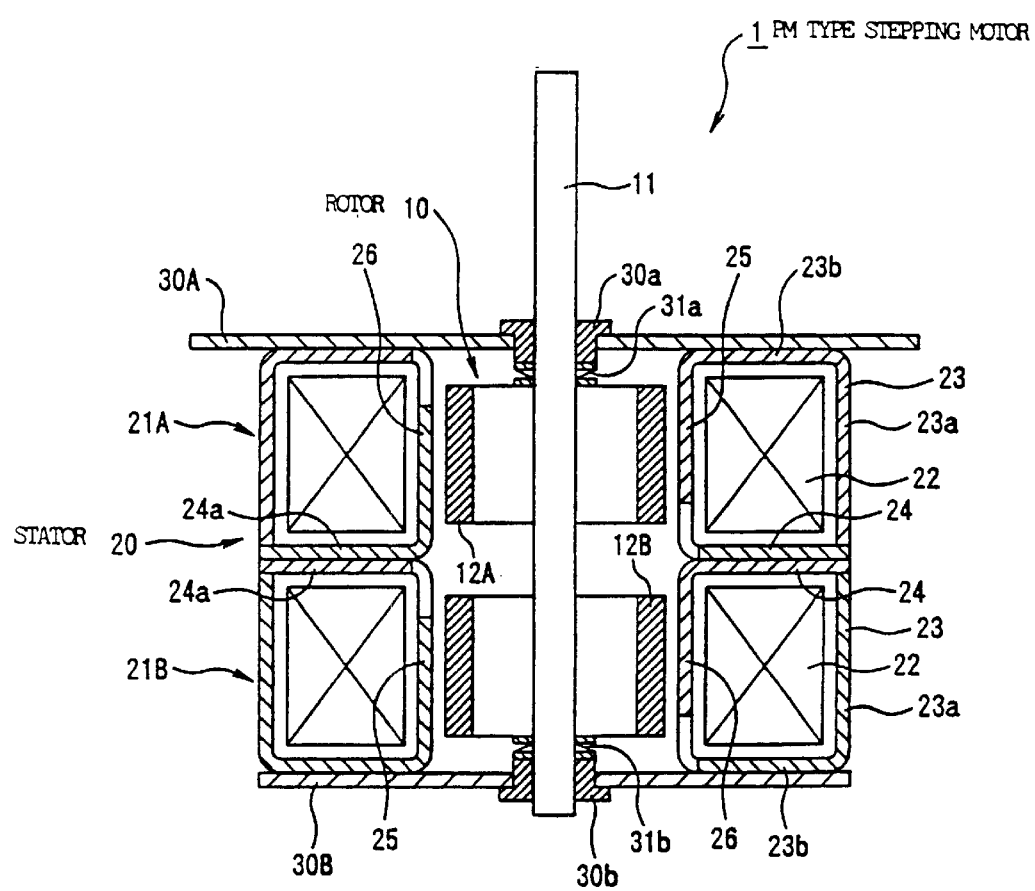
FIG. 1 is a sectional view of a PM type stepping motor according to the first exemplary embodiment of the present invention.

FIGS. 1 and 2(A)–(B) show a first exemplary embodiment of the present invention. In this exemplary embodiment, the present invention is applied to a two phase PM type stepping motor.

That is, the PM type stepping motor 1 of this exemplary embodiment is equipped with a rotatable rotor 10 and a stator 20 surrounding the rotor 10 in a non-contact state.

The rotor 10 has a rotation shaft 11 which is rotatably supported at two positions axially spaced apart from each other by covers 30A and 30B as stator side members through the intermediation of bearings 30a and 30b. However, between the rotation shaft 11 and the bearings 30a and 30b, plate springs 31a and 31b are provided as elastic members capable of elastic deformation in the axial direction, whereby the rotation shaft 11 is axially movable relative to the covers 30A and 30B within the range in which the elastic deformation of the plate springs 31a and 31b is possible.

Further, at positions of the rotation shaft 11 between the covers 30A and 30B, cylindrical permanent magnets 12A and 12B are fixed, which are axially spaced apart from each other. These permanent magnets 12A and 12B are of the same construction, and as shown in FIG. 2(A), which is a development illustrating the outer peripheral surface thereof, N and S poles are alternately and circumferentially polarized at a fixed pitch P1.

On the other hand, the stator 20 includes first and second stator units 21A and 21B vertically stacked together in two stages in correspondence with the permanent magnets 12A and 12B. The stator units 21A and 21B are the same members except that there is some deviation in the circumferential positions of the stator polar teeth, described below, and that they are vertically reversed.

That is, each of the first and second stator units 21A and 21B is equipped with an exciting coil 22, an outer yoke 23 and an inner yoke 24, and the exciting coil 22 is formed by winding wire into a cylindrical form and performing insulation processing on it. The exciting coil 22 is placed between the outer yoke 23 and the inner yoke 24.

The outer yoke 23 is equipped with a cylindrical housing portion 23a covering the outer peripheral surface of the exciting coil 22, a disc-like plate portion 23b covering the end surface of the exciting coil 22 on the side close to the cover 30A or 30B, and a plurality of comb-teeth-like stator polar teeth 25 extending axially from the center of the plate portion 23b along the inner peripheral surface of the exciting coil 22. The housing portion 23a, the plate portion 23b and the stator polar teeth 25 of the outer yoke 23 are formed integrally out of a steel plate by pressing.

The inner yoke 24 is equipped with a disc-like plate portion 24a covering the end surface of the exciting coil 22 that is distanced from the cover 30A or 30B, and a plurality of comb-teeth-like stator polar teeth 26 extending axially from the center of the plate portion 24a along the inner peripheral surface of the exciting coil 22. The plate portion 24a and the stator polar teeth 26 of the inner yoke 24 is formed integrally out of a steel plate by pressing.

The number of stator polar teeth 25 of the outer yoke 23 is the same as the number of stator polar teeth 26 of the inner yoke 24 (which is 12 in this embodiment), and the stator polar teeth 25 and 26 are alternately arranged on the inner peripheral surface of the exciting coil 22 so as not to be in contact with each other.

FIG. 2(B) is a development of a part of the outer yoke 23 and the inner yoke 24, showing six to seven stator polar teeth 25a through 25g and stator polar teeth 26a through 26f for the outer yoke 23 and the inner yoke 24 of each of the first stator unit 21A and the second stator unit 21B. The specific positions of the stator polar teeth 25 and 26 will be described below.

The first stator unit 21A and the second stator unit 21B are placed between the covers 30A and 30B and secured in position in the condition in which they are stacked together, such that the circumferential positions of the stator polar teeth 25 and 26 are deviated by a predetermined angle.

In the PM type stepping motor 1, constructed as described above, a rotating magnetic field is formed by sequentially switching the current caused to flow through the exciting coils 22 by a drive circuit (not shown), and the rotor 10 is driven.

Next, the specific positions of the stator polar teeth 25 and 26 of this embodiment will be described. Twelve stator polar teeth 25 and twelve stator polar teeth 26 are provided. Of these, six stator polar teeth 25 and six stator polar teeth 26 are combined to constitute one set. That is, there are two sets, each set being appropriately divided into teeth groups as described below. Thus, a description will only be given of the formation positions of six stator polar teeth 25 and six stator polar teeth 26.

That is, in this embodiment, the relationship of formulas:

$$P2=P1 \{1 \pm i/u\}, \text{ and} \quad (4)$$

$$P3=P1 \{m \pm i'/(n \cdot v')\} \quad (5)$$

holds true in order that the relationship of formulas:

$$P2 \neq P1, \quad (1)$$

$$P3 \neq m \cdot P1, \text{ and} \quad (2)$$

$$P3 \neq m \cdot P2 \quad (3)$$

may hold true.

More specifically, the relationship of formulas:

$$P2=P1 \{1-i/u\}, \text{ and} \quad (8)$$

$$P3=P1 \{m-i'/(n \cdot v')\} \quad (9)$$

holds true.

In the PM type stepping motor 1 of this embodiment, the values for determining the pitches P2 and P3 are as follows:

$$m=3, n=2, u=32, i=1, i'=1, v'=4.$$

That is, in this embodiment, each of the yokes 23 and 24 is equipped with six stator polar teeth 25a through 25f, and 26a through 26f. Regarding the outer yoke 23, the six stator polar teeth 25a through 25f are divided into two teeth groups, each group consisting of three stator polar teeth 25a through 25c, and 25d through 25f. Regarding the inner yoke 24 also, the six stator polar teeth 26a through 26f are divided into two teeth groups, each group consisting of three stator polar teeth 26a through 26c, and 26d through 26f.

Each teeth group of the outer yoke 23 and the inner yoke 24 is set such that, for example, one teeth group 25a through 25c of the outer yoke 23 circumferentially overlaps only one teeth group 26a through 26c of the inner yoke 24. This relationship remains the same if the number of teeth groups or the number of stator polar teeth constituting each teeth group is changed.

And, when the above values are substituted into formulas (8) and (9), $$P2=P1 \{1-1/32\}, \text{ and}$$

$$P3=P1 \{3-1/8\}.$$

The formation positions of the stator polar teeth 25a through 25f and 26a through 26f are determined so as to achieve these pitches P2 and P3.

Figure 3:
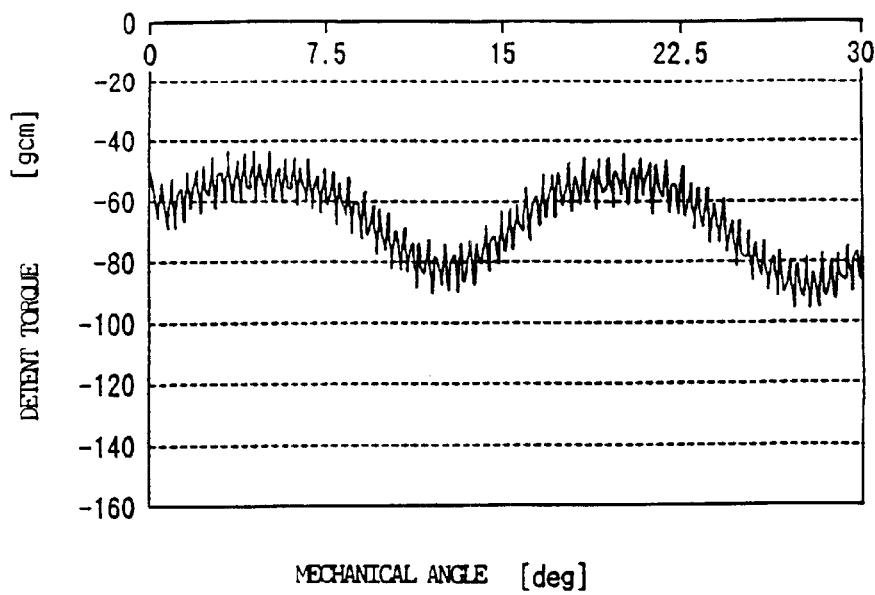
FIG. 3 is a waveform diagram illustrating the operation of the exemplary embodiment.
Figure 4:
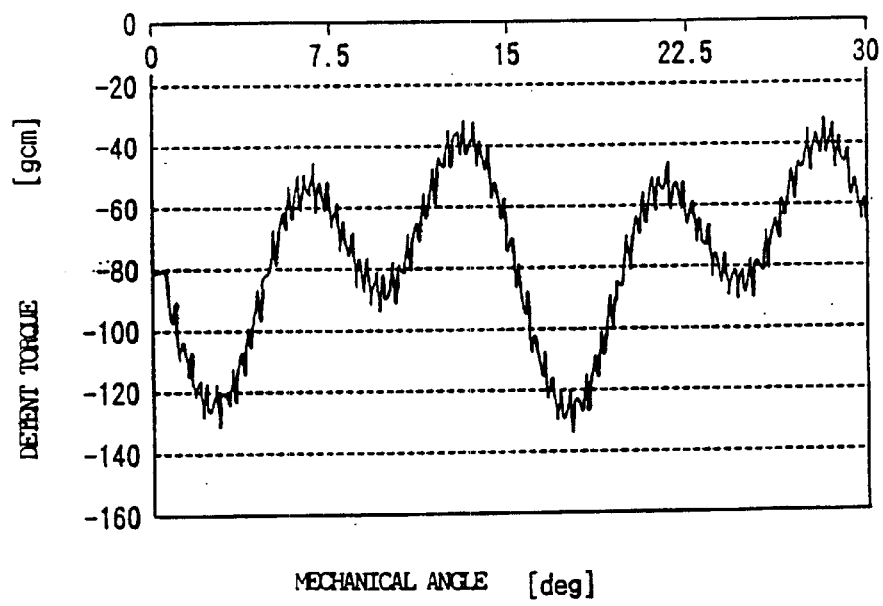
FIG. 4 is a waveform diagram illustrating a conventional example.
Figure 5:
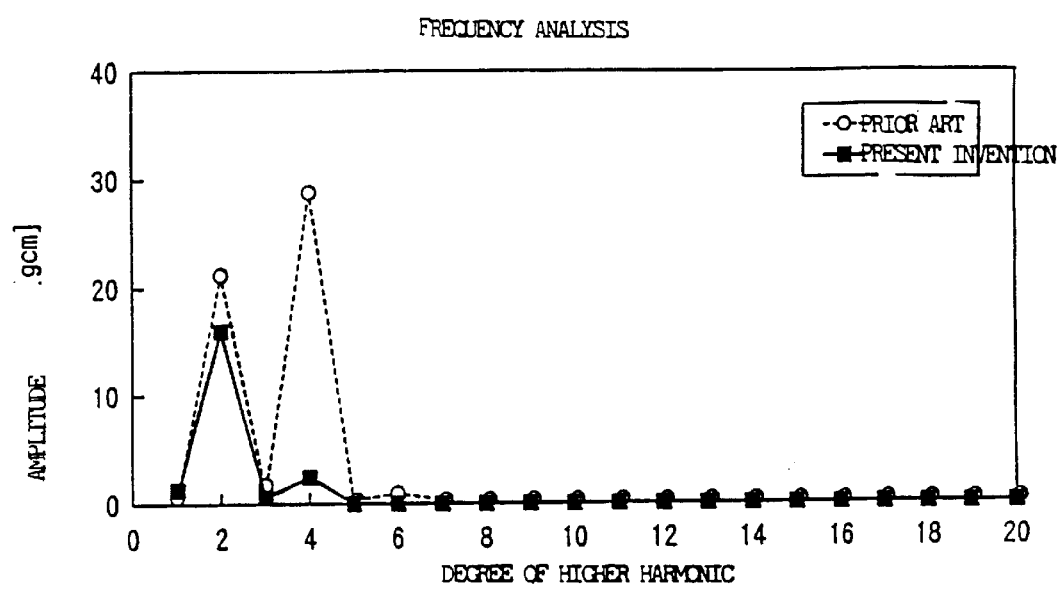
FIG. 5 is a diagram showing the results of frequency analysis of higher harmonic component of detent torque.

In this construction, since v'=4, it is possible to reduce the fourth-degree higher harmonic of the detent torque. FIG. 3 is a waveform diagram, which was obtained by actually performing measurement on a two phase PM type stepping motor, the number of steps of which is 48 and to which the construction of this exemplary embodiment is applied. As can be seen from comparison with FIG. 4, which is a diagram obtained by performing a similar measurement on a conventional PM type stepping motor, the amplitude is substantially reduced. Through frequency analysis of the results shown in FIGS. 3 and 4, a substantial reduction in fourth degree higher harmonic has been ascertained, as shown in FIG. 5.

Further, in this exemplary embodiment, it is possible to prevent the gap between the stator polar teeth 25 of the outer yoke 23 and the stator polar teeth 26 of the inner yoke 24 from becoming extremely small. That is, for example, the pitch P4 between the stator polar tooth 25d and the stator polar tooth 26c shown in FIG. 2(B) will be considered. Assuming that the stator polar teeth 25 and the stator polar teeth 26 are arranged at a fixed pitch, the pitch P2 is equal to the pitch P1, so that P4=P1/2. However, if the pitch P2 of the stator polar teeth 25 and the stator polar teeth 26 is not fixed as in the case, for example, of the PM type stepping motor of the above-mentioned Japanese Unexamined Patent Application Publication No. 10-136631, the pitch of the stator polar teeth 25 and the stator polar teeth 26 adjacent to each other is large in some places and small in other places, so that the minimum value of the pitch of the stator polar teeth 25 and the stator polar teeth 26 adjacent to each other must be smaller than P1/2.

However, when, as in this exemplary embodiment, the pitches P2 and P3 are set according to formulas (8) and (9) discussed above (which is the same when formulas P2=P1 {1−i/u} (6), and P3=P1 {m−i'/(n·v')} (7) are selected), the deviation direction due to the pitch P2 and the deviation direction due to pitch P3 cancel out each other, whereby it is possible to prevent the pitch P4 from becoming extremely small.

This will be specifically illustrated with reference to FIG. 2(B). When, for example, the condition before the setting of the pitches P2 and P3, in which the pitch P2 is equal to the pitch P1, and the positions of the central stator polar teeth 25b and 26b of the teeth groups 25a through 25c and 26a through 26c are considered as fixed, and when the pitch P2 is set according to formula (8) with respect to these fixed positions, the stator polar teeth 25a and 25c approach the stator polar tooth 25b, and the stator polar teeth 26a and 26c approach the stator polar tooth 26b. A similar movement is also generated with respect to the teeth groups 25d through 25f and 26d through 26f. As a result, the distance between the end portions of the teeth groups changes such that the end portions are spaced apart from each other (the pitch P4 increases). Thus, if, as a result of setting the pitch P3 of the teeth groups according to formula (9), the distance between the end portions of the teeth groups changes such that the end portions approach each other (that is, if the pitch P4 decreases), an increase in the pitch P4 is already achieved due to the setting of the pitch P2, so that it is possible to prevent the pitch P4 from becoming extremely small. When, instead of formulas (8) and (9), formulas (6) and (7) are adopted, an extreme reduction in the pitch can be prevented. In the construction of this exemplary embodiment, the minimum value of the pitch P4 is equal to 0.88·(P1/2), which is relatively large as compared with the minimum value of the pitch in the case of the PM type stepping motor disclosed in Japanese Unexamined Patent Application Publication No. 10-136631, which is 0.83·(P1/2).

And, when the pitch P4 is not extremely small, it is possible to prevent an increase in the leakage flux flowing between the stator polar teeth 25d and 26c, whereby it is possible to prevent a substantial reduction in the torque generated.

Further, in this exemplary embodiment, plate springs 31a and 31b are provided between the rotation shaft 11 and the bearing 30a and between the rotation shaft 11 and the bearing 30b, respectively, so that a further reduction in vibration can be advantageously achieved. That is, even when a force causing axial vibration of the stator polar teeth 25 and 26 is generated due to the electromagnetic force when driving the PM type stepping motor 1, and the reaction force of that force is input to the rotor 10 side through the permanent magnet, the rotation shaft is axially movable within the range in which the elastic deformation of the plate springs 31a and 31b is possible, so that the rotation shaft 11 collide with the bearings 30a and 30b to thereby reduce the possibility of generating sliding and impact sound.

FIGS. 6(A)–(B) are diagrams showing a second exemplary embodiment of the present invention. In particular, FIGS. 6(A)–(B) are developments similar to FIGS. 2(A)–(B) showing the first exemplary embodiment described above. Since the general construction of the PM stepping motor of this exemplary embodiment is the same as that of the first exemplary embodiment, the stepping motor is not shown and an overlapping description is omitted, and the components and the positions which are the same as those of the first exemplary embodiment are indicated by the same reference numerals, a description thereof being omitted.

In this embodiment, the relationship of formulas:

$$P2=P1\ \{1\pm i/(m\cdot v)\},\ \text{and} \tag{10}$$

$$P3=P1\ \{m\pm i'/(n\cdot v')\} \tag{11}$$

holds true in order that the relationship of formulas (1) through (3) discussed above may hold true. More specifically, the relationship of formulas:

$$P2=P1\ \{1-i/(m\cdot v)\},\ \text{and} \tag{14}$$

$$P3=P1\ \{m-i'/(n\cdot v')\} \tag{15}$$

holds true.

In the PM type stepping motor of this embodiment, the values for determining the pitches P2 and P3 are as follows:

$$m=3,\ n=2,\ i=2,\ v=4,\ i'=1,\ v'=2.$$

That is, in this exemplary embodiment also, the six stator polar teeth 25a through 25f of the outer yoke 23 are divided into two teeth groups each consisting of three stator polar teeth 25a through 25c, and 25d through 25f, and the six stator polar teeth 26a through 26f of the inner yoke 24 are divided into two teeth groups each consisting of three stator polar teeth 26a through 26c, and 26d through 26f. From formulas (14) and (15), the pitches P2 and P3 are obtained as follows:

$$P2=P1\ \{1-2/12\},\ \text{and}$$

$$P3=P1\ \{3-1/4\}$$

In this construction, since v=4, the fourth-degree higher harmonic of the detent torque is reduced by the deviation in the pitch P2 of the stator polar teeth 25a through 25c, 25d through 25f, 26a through 26c, and 26d through 26f in the teeth groups, and, since v'=2, the second-degree higher harmonic of the detent torque is reduced by the deviation in the pitch P3 between the teeth groups 25a through 25c and 25d through 25f, and between the teeth groups 26a through 26c and 26d through 26f. Thus, unlike the conventional PM type stepping motor, it is capable of reducing higher harmonics of many degrees, whereby it is possible to achieve a more quiet and smooth rotation.

Further, in this embodiment also, formulas (14) and (15) are adopted to set the pitches P2 and P3, so that as in the first exemplary embodiment described above, the pitch P4 increases when setting the pitch P2. Thus, if the pitch P4 becomes small when setting the pitch P3, it is possible to prevent it from becoming extremely small, so that it is possible to prevent an increase in the leakage flux flowing between the stator polar teeth 25d and 26c, whereby it is possible to prevent a great reduction in the torque generated. When, instead of formulas (14) and (15), formulas:

$$P2=P1\ \{1-i/(m\cdot v)\},\ \text{and} \tag{12}$$

$$P3=P1\ \{m+i'/(n\cdot v')\} \tag{13}$$

are adopted, it is possible to prevent the pitch from becoming extremely small.

Figure 7:
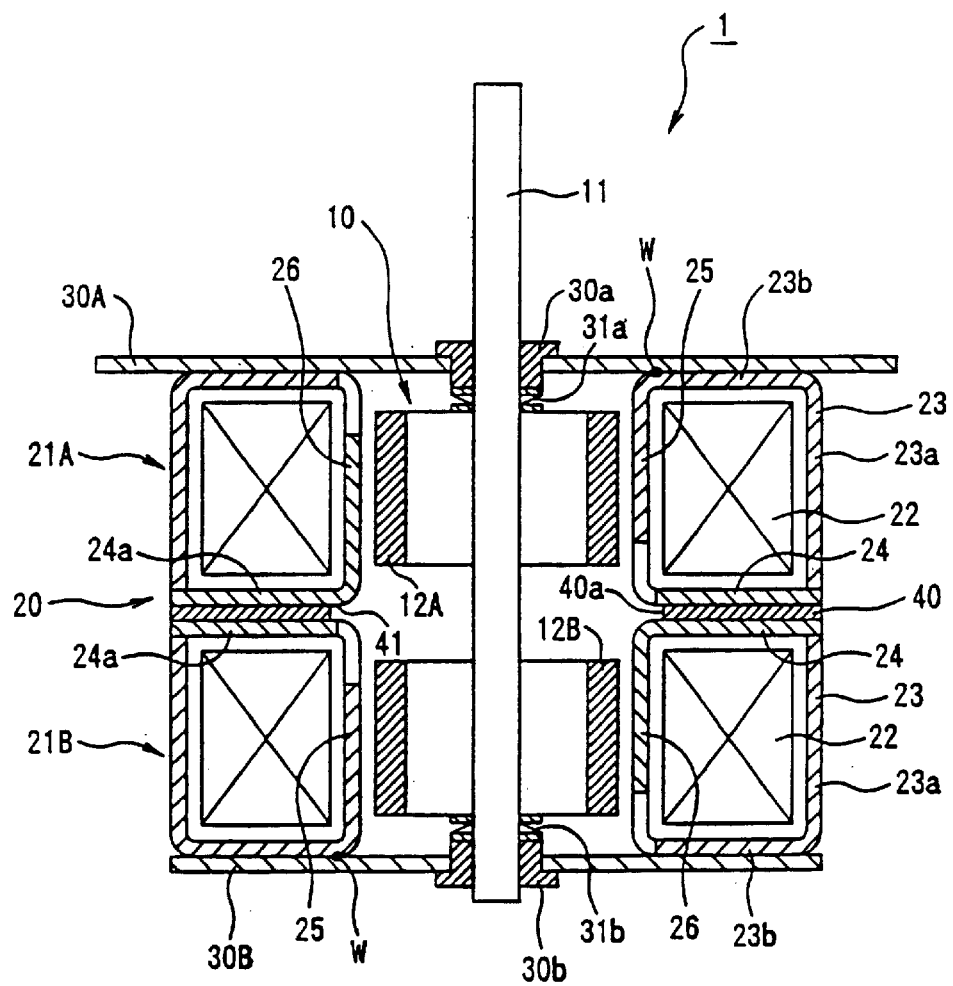
FIG. 7 is a sectional view of a PM type stepping motor according to the third exemplary embodiment.
Figure 8:
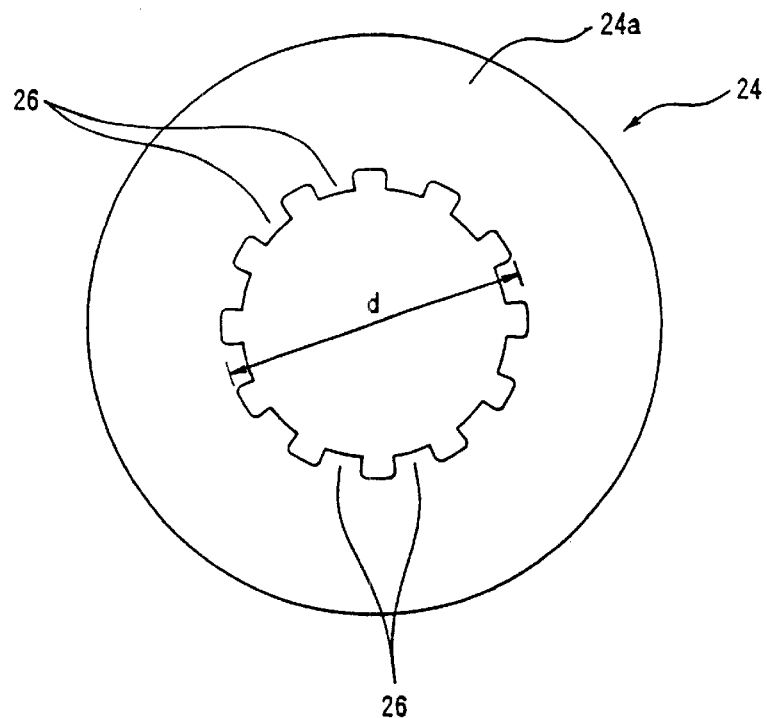
FIG. 8 is a plan view of an inner yoke.

FIGS. 7 through 10 are diagrams showing a third exemplary embodiment of the present invention. FIG. 7 is a sectional view of a two phase PM type stepping motor 1 similar to that of FIG. 1. The components and positions which are the same as those of the first exemplary embodiment are indicated by the same reference numerals, and a description thereof will be omitted. In this exemplary embodiment also, the circumferential positional relationship of the stator polar teeth 25 and 26 is set according to formulas (6) and (7), formulas (8) and (9), formulas (12) and (13), and formulas (14) and (15) as in the first and second exemplary embodiments described above.

Figure 9:
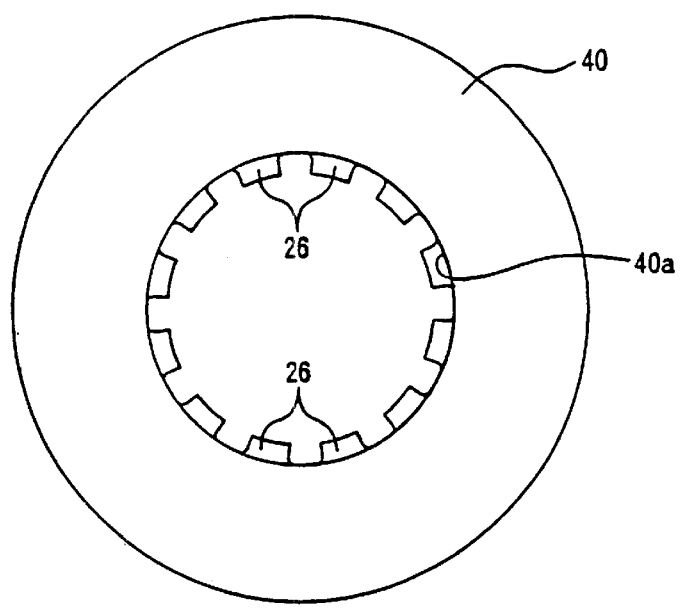
FIG. 9 is a plan view of the inner yoke with a spacer superimposed thereon.

In this exemplary embodiment, a disc-like spacer 40 is provided between the first stator unit 21A and the second stator unit 21B. However, at the center of the spacer 40, there is formed a circular opening 40a having a diameter approximately the same as the diameter d of the plate portion 24a of the inner yoke 24 (See FIG. 8), whereby, as shown in FIG. 9, the spacer 40 is only in contact with the plate portion 24a of the inner yoke 24, and is not in contact with the base portions of the stator polar teeth 26.

Thus, there is formed an axial gap 41 between the first stator unit 21A and the second stator unit 21B which are axially adjacent to each other, whereby the base portions of the stator polar teeth 26 are not in contact with each other.

Figure 10:
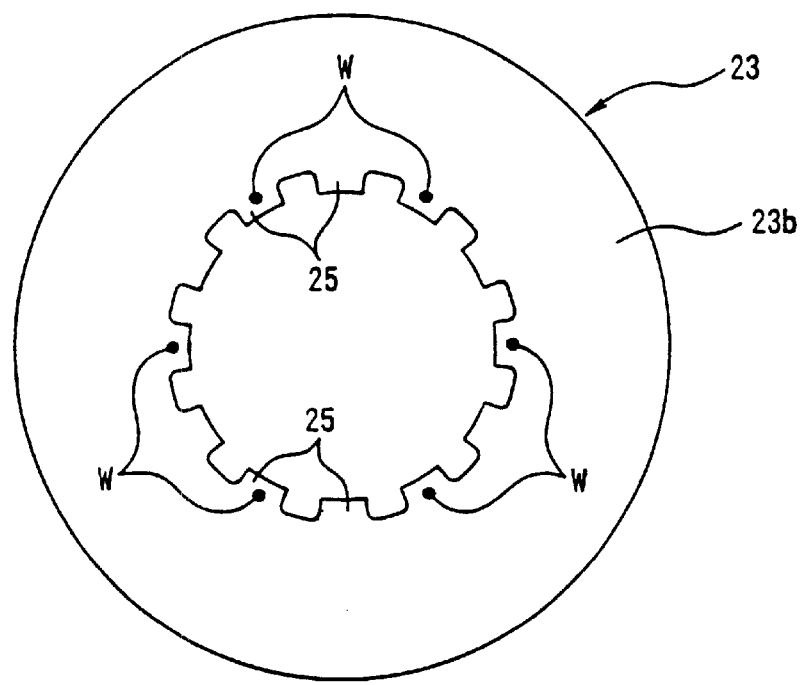
FIG. 10 is a plan view of an outer yoke.

On the other hand, the plate portion 23b of the outer yoke 23 is in contact with the covers 30A and 30B, and of the portion in contact with the covers 30A and 30B, a welding point w is set at the base portions of the stator polar teeth 25, and spot welding is performed at the welding point w to join the base portions of the stator polar teeth 25 to the cover 30A or 30B. More specifically, in this exemplary embodiment, as shown in FIG. 10, a welding point w is set at every other base portion of the stator polar teeth 25 to perform spot welding, whereby the stator polar teeth 25 are not easily detached from the covers 30A and 30B.

In this exemplary embodiment, which has the above-described construction, even if a force causing axial vibration of the stator polar teeth 25 and 26 is generated due to the electromagnetic force when driving the PM type stepping motor 1, noise attributable thereto is no easily generated. The first reason for it is that in this embodiment also, as in the first exemplary embodiment, plate springs 31a and 31b are provided between the rotation shaft 11 and the bearing 30a and between the rotation shaft 11 and the bearing 30b, respectively.

The second reason for it is that a gap 41 is formed. That is, even if the stator polar teeth 26 of the inner yoke 24 axially vibrate due to the electromagnetic force when driving the PM type stepping motor 1, it is possible, due to the formation of the gap 41, to avoid collision of the stator polar teeth 26 on the first stator unit 21A side with the stator polar teeth 26 on the second stator unit 21B side. Further, by reducing the contact portion of the inner yoke 24, it is possible to reduce the magnetic interference between the first and second stator units 21A and 21B, so that it is possible to prevent fluctuation in electromagnetic force or unevenness in rotation attributable thereto.

The third reason for it is that the stator polar teeth 25 are not easily separated from the covers 30A and 30B. That is, even if an axial force is input to the stator polar teeth 25 of the outer yoke 23 due to the electromagnetic force when driving the PM type stepping motor 1, the stator polar teeth 25 cannot collide with the covers 30A and 30B when returning to the original positions as long as the stator polar teeth 25 are not separated from the covers 30A and 30B.

Thus, in the construction of this exemplary embodiment, it is possible to reduce the higher harmonic component of the detent torque due to the action similar to that of the first and second exemplary embodiments and, further, the vibration caused by the force axially vibrating the stator polar teeth 25 and 26 due to the electromagnetic force when driving the PM type stepping motor 1, so that it is advantageously possible to achieve a very quiet and smooth rotation.

In this exemplary embodiment, the construction in which the base portions of the stator polar teeth 25 of the outer yoke 23 are joined to the covers 30A and 30B by welding corresponds to the structure for preventing collision with the cover.

Figure 11A:
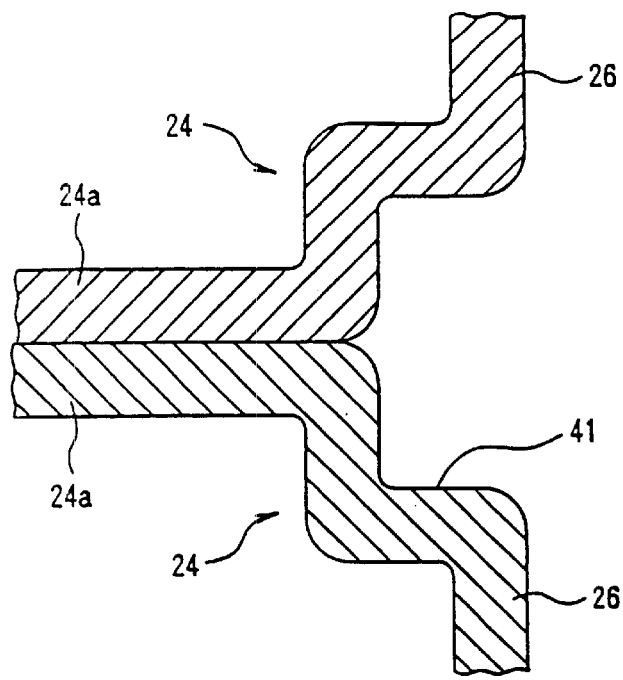
FIGS. 11(A)–(B) are sectional views showing a modification of the inner yoke.
Figure 11B:
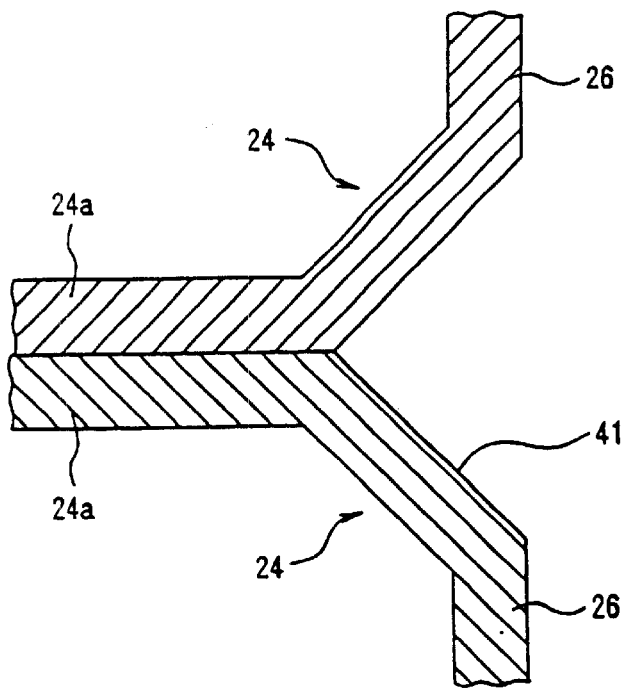

While in the third exemplary embodiment the gap 41 is formed by utilizing the spacer 40, this should not be construed restrictively. It is also possible to form the gap 41 by deforming the base portions of the stator polar teeth 26 in the direction separated from the adjacent inner yoke 24. More specifically, as shown, for example, in FIG. 11(A), the gap 41 may be formed by deforming the base portions of the stator polar teeth 26 in a step-like manner, or as shown in FIG. 11(B), the gap 41 may be formed by bending the base portions of the stator polar teeth 26. The configurations as shown in FIGS. 11(A) and 11(B) can be integrally obtained when forming the inner yoke 24 by pressing, so that no increase in production cost is involved.

Figure 12:
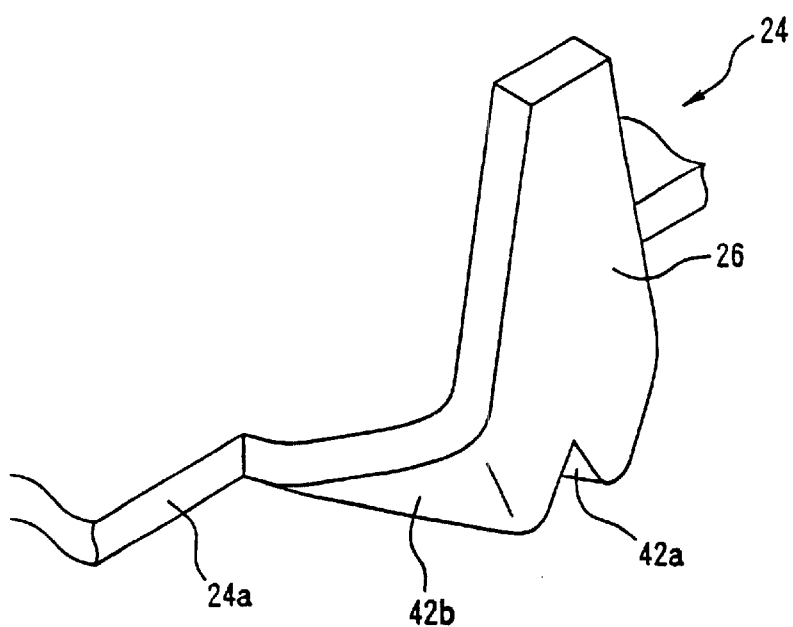
FIG. 12 is a perspective view of a modification of the stator polar tooth.
Figure 13:
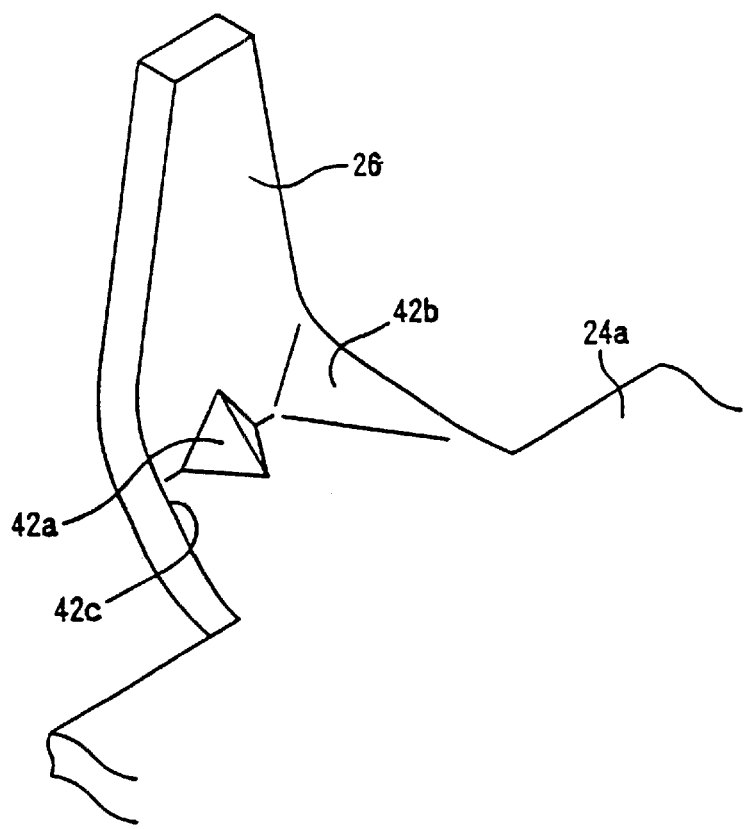
FIG. 13 is a perspective view of the modification of the stator polar tooth seen from a different direction.
Figure 14:
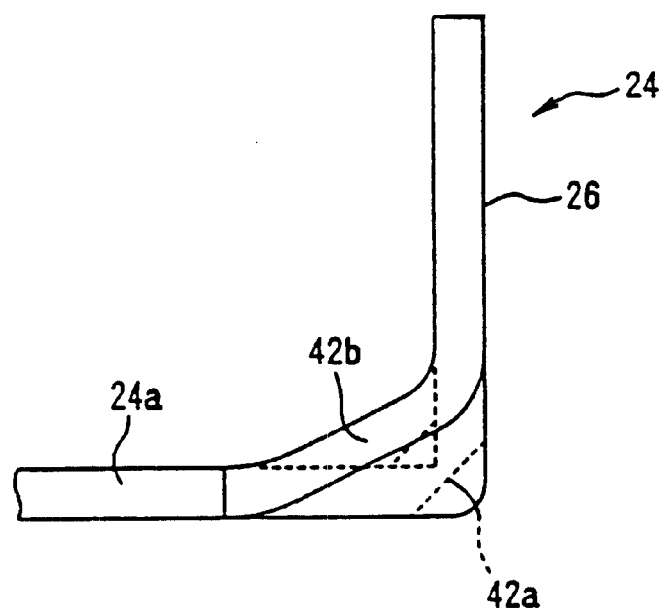
FIG. 14 is a side view of the modification of the stator polar tooth.

Further, as the construction for reducing the noise caused by the electromagnetic force when driving the PM type stepping motor 1, it is also possible to adopt the construction as shown in FIGS. 12 through 14. FIG. 12 is a perspective view of one stator polar tooth 26 of the inner yoke 24 and the plate portion 24a in the vicinity thereof, FIG. 13 is a perspective view as seen from the opposite direction, and FIG. 14 is a side view of the same portion. Ribs 42a, 42b and 42c extending along the radial direction of the inner yoke 24 are integrally formed at the center and on both sides of the base portion of the stator polar tooth 26 by pressing. It is possible to adopt a similar construction for the stator polar tooth 25 of the outer yoke 23. When the ribs 42a, 42b and 42c are formed on the stator polar teeth 25 and 26, even if a force causing axial vibration of the stator polar teeth 25 and 26 is generated due to the electromagnetic force when driving the PM type stepping motor 1, it is possible to eliminate or minimize the vibration of the stator polar teeth 25 and 26, so that it is possible to prevent the stator polar teeth 25 and 26 from colliding with the covers 30A and 30B and other stator polar teeth 26 close thereto or minimize the impact. Thus, it is possible to eliminate or minimize the noise.

Further, in the construction shown in FIGS. 12 through 14, the ribs 42a, 42b and 42c are integrally formed by stamping, so that, unlike the construction in which separate members are fastened afterwards, no increase in production cost is involved.

Figure 15:
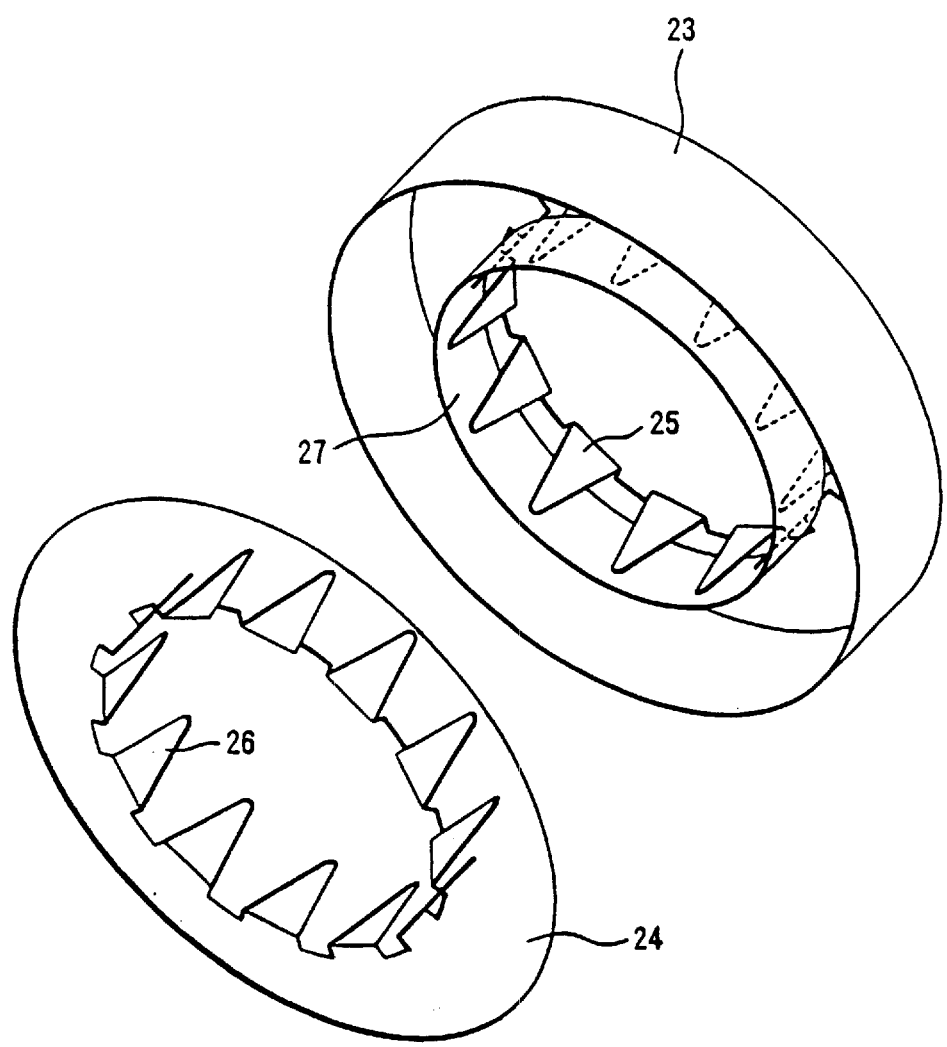
FIG. 15 is a perspective view of the outer yoke and the inner yoke of the fourth exemplary embodiment.
Figure 16:
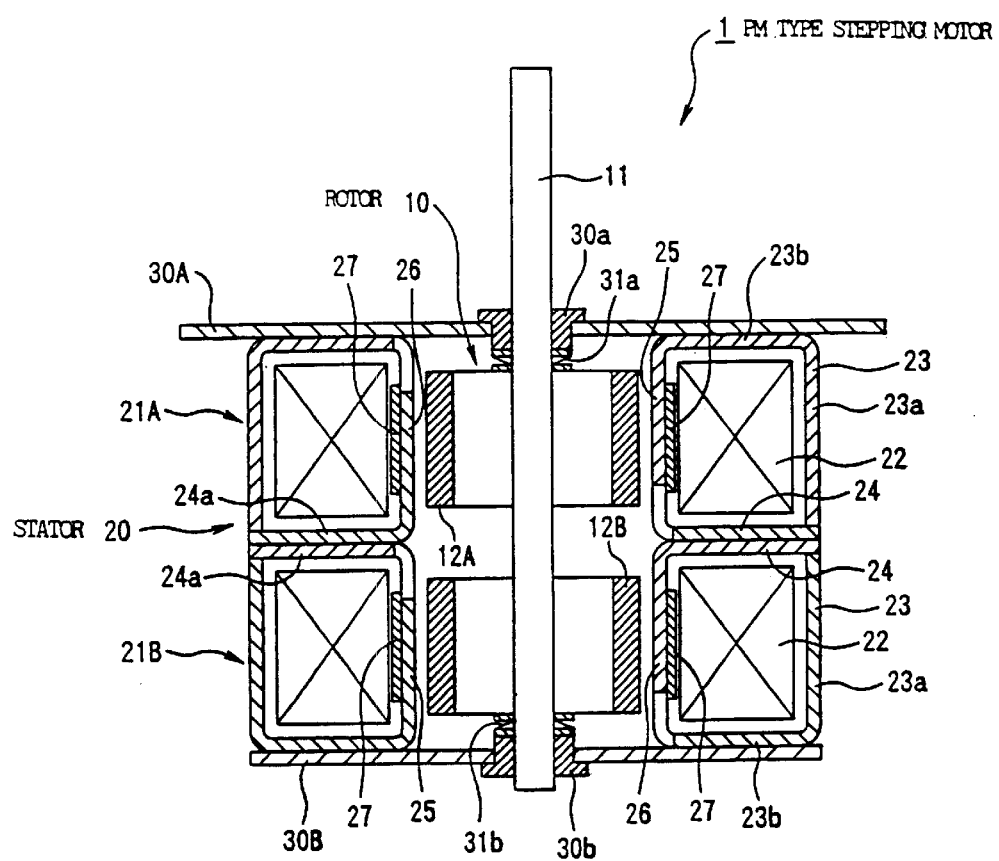
FIG. 16 is a sectional view of the PM type stepping motor of the fourth exemplary embodiment.

FIGS. 15 through 17 show a fourth exemplary embodiment of the present invention. FIG. 15 is a perspective view of the outer yoke 23 and the inner yoke 24. The general construction of the PM stepping motor is the same as that of the first exemplary embodiment, so it is not shown in the drawing a description thereof will be omitted. The components and positions which are the same as those of the first exemplary embodiment are indicated by the same reference numerals, and a description thereof will be omitted.

In this exemplary embodiment, as shown in FIG. 15, in the outer periphery of the forward ends of the stator polar teeth 25 of the outer yoke 23, there is provided a ring 27 serving as a restraining member for restraining outward and radial deformation of the stator polar teeth 25, and due to this ring 27, outward deformation of the stator polar teeth 26 of the inner yoke 24 is also restrained. That is, the ring 27 is formed of a non-magnetic material, such as aluminum or brass. As shown in the sectional view of FIG. 16, the width of the ring is such that when the ring 27 is attached to the stator polar teeth 25 of the outer yoke 23 and the inner yoke 24, it can cover from the forward ends of the stator polar teeth 25 of the outer yoke 23 to the ends of the stator polar teeth 26 of the inner yoke 24, which are engaged with each other. The wall thickness of the ring is such that when the ring 27 is attached to the stator polar teeth 25 and 26, a margin is left between the ring 27 and the exciting coil 22, and that outward deformation of the stator polar teeth 25 and 26 can be restrained.

For example, after press-fitting the ring 27 onto the outer peripheral surface of the stator polar teeth 25 of the outer yoke 23, the stator polar teeth 26 of the inner yoke 24 are forced into this ring 27, whereby the ring 27 is attached to the stator polar teeth 25 of the outer yoke 23 and the stator polar teeth 26 of the inner yoke 24.

Figure 17A:
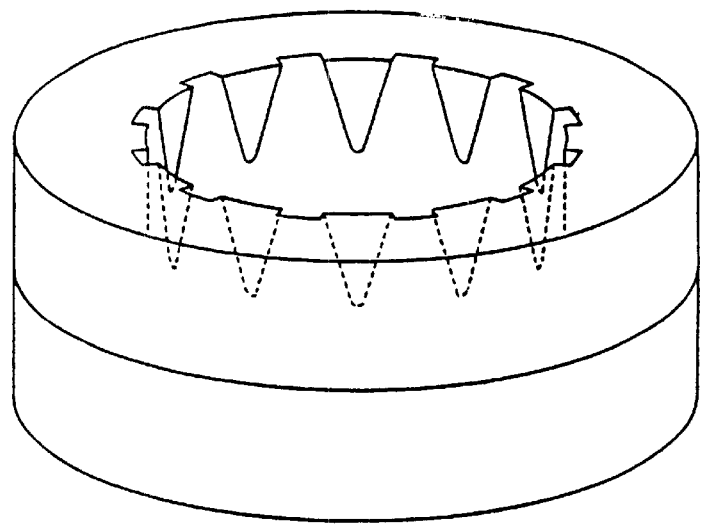
FIGS. 17(A)–(B) are diagrams illustrating how the stator polar teeth are deformed.
Figure 17B:
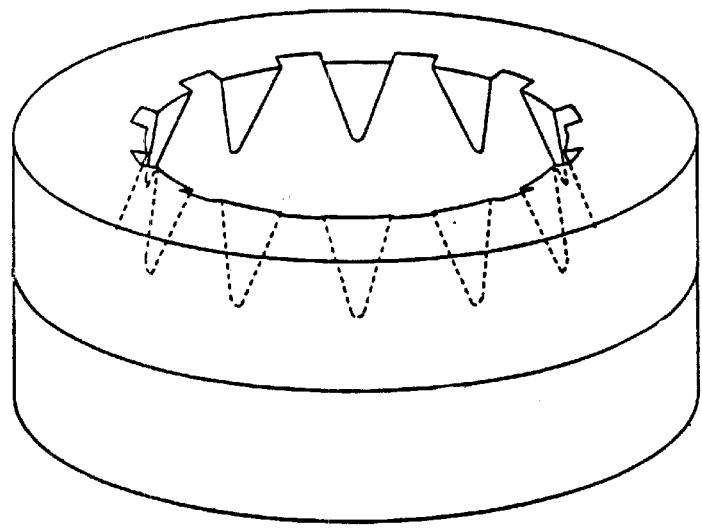

When an electromagnetic force acting radially or axially when driving the motor is applied to the stator polar teeth 25 and 26, due to the low stiffness of these stator polar teeth 25 and 26 portions, the stator polar teeth 25 and 26 are deformed radially outward each time there is a change in the opposed positions of the magnetic pole of the rotor 10 and the stator polar teeth 25 and 26 to thereby also cause axial deformation, thereby generating vibration and causing noise. That is, as compared with the case in which the motor is not driven as shown in FIG. 17(A), in the case when the motor is driven as shown in FIG. 17(B), the stator polar teeth are deformed radially outward, the nearer the forward end, the greater the deformation. While FIG. 17(B) only shows one set of stator polar teeth, this phenomenon is to be observed in both sets of the stator polar teeth 25 and 26 of the outer yoke 23 and the inner yoke 24.

However, in this exemplary embodiment, there is provided the ring 27, which is engaged with the portions near the forward ends of the stator polar teeth 25 and 26, so that it is possible to restrain the radial and outward deformation of the stator polar teeth 25 and 26. Thus, the deformation of the stator polar teeth 25 and 26 is restrained, so that the vibration due to the deformation of the stator polar teeth 25 and 26 is also restrained.

The deformation of the stator polar teeth 25 and 26 might be restrained, for example, by filling the gap between the stator polar teeth 25 and 26 and the exciting coil 22 with resin or the like, or embedding metal. However, resin has low rigidity, and it is necessary to fill the gap between the stator polar teeth 25 and 26 and the exciting coil 22 with resin to secure them, with the result in that the assembly takes much time. On the other hand, the method of embedding metal is difficult from the viewpoint of production. Further, an inadvertent stress could be applied to the stator polar teeth 25 and 26. However, in this exemplary embodiment, it is only necessary to attach the ring 27 to the stator polar teeth 25 and 26, so that the assembly is easy to perform. Further, since the ring 27 is formed so as to leave a margin between it and the exciting coil 22, it is easy to perform the assembly even when mounting the stator polar teeth 25 and 26 and the exciting coil 22.

Further, as shown in FIG. 17, the amount of deformation is larger at the forward ends of the stator polar teeth 25 and 26 than at the base portions thereof. In this exemplary embodiment, however, a ring is provided in the vicinity of the forward ends of the stator polar teeth 25 and 26, so that the ring 27 is provided where the amount of deformation of the stator polar teeth 25 and 26 is maximum, whereby it is possible to effectively restrain the deformation of the stator polar teeth 25 and 26.

While in this exemplary embodiment the stator polar teeth 25 and 26 of both the outer yoke 23 and the inner yoke 24 are constrained, this should not be construed restrictively. It is also possible to provide two rings: a ring for constraining the stator polar teeth 25 of the outer yoke 23 and a ring for constraining the stator polar teeth 26 of the inner yoke 24.

However, by constraining the stator polar teeth 25 and 26 of both the outer yoke 23 and the inner yoke 24 by the single ring 27, it is possible to restrain the increase in the number of parts of the motor to a minimum level.

Further, while in this exemplary embodiment the ring 27 is provided as the constraining member for the stator polar teeth 25 and 26, it is not absolutely necessary for the constraining member to be in the form of a ring. For example, it may be a member in the form of a coil, and any type of member is applicable as long as it is capable of restraining the deformation of the stator polar teeth 25 and 26.

Further, while in the above-described embodiment the wall thickness of the ring 27 is such that a margin is left between the ring 27 and the exciting coil 22 when the ring 27 is attached to the stator polar teeth 25 and 26, it is not absolutely necessary for the margin to be left; it is only necessary for the wall thickness to be smaller than the distance between the ring 27 and the exciting coil 22. The essential thing is that the wall thickness be such that when assembling the stator polar teeth 25 and 26 and the exciting coil 22, the assembly can be easily performed even when the ring 27 is attached.

Further, in this exemplary embodiment, it is possible to form on the side of the ring 27 opposed to the stator polar teeth 25 and 26 recesses or the like of a configuration in conformity with the stator polar teeth 25 and 26 for the positioning of the stator polar teeth 25 and 26, and use them as a guide when engaging the stator polar teeth 26 and 26 with the ring 27.

Further, while in the above-described embodiment the ring 27 is used which cover the forward ends of the stator polar teeth 25 and 26, it is not absolutely necessary for the ring to cover up to the forward ends; it suffices to cover the portions near the forward ends so that the deformation of the stator polar teeth 25 and 26 can be restrained.

While in the above-described embodiments the PM type stepping motor of the present invention is applied to a two phase PM type stepping motor 1, the object of application of the present invention is not restricted to this. The present invention is also applicable to a PM type stepping motor of one phase or three or more phases.

Further, while in the above-described first and second exemplary embodiments the pitches P2 and P3 are set so as to aim at a reduction in the fourth-degree higher harmonic component of the detent torque or the second-degree higher harmonic component and the fourth-degree higher harmonic component of the detent torque, this should not be construed restrictively. For example, in the case of a three phase PM type stepping motor, it is possible to adopt a construction in which the fourth degree higher harmonic component and the sixth-degree higher harmonic component can be reduced, and, in the case of a four phase PM type stepping motor, it is possible to adopt a construction in which the fourth-degree higher harmonic component and the eighth-degree higher harmonic component can be reduced, and the selection can be arbitrarily effected.

As described above, in the exemplary embodiments of the invention, the pitch P2 of the stator polar teeth in the teeth group and the pitch P3 of the teeth groups may be appropriately set, so that higher harmonics of higher degree can be reduced, whereby the higher harmonics can be efficiently reduced and a more quiet and smooth rotation can be achieved.

In particular, it may be possible to prevent the gap between the stator polar teeth from becoming extremely small, so that it is possible to prevent an increase in the leakage flux flowing between the stator polar teeth, whereby it is possible to avoid a great reduction in the torque generated.

Further, even if a force causing axial vibration of the stator polar teeth of the outer yoke and the inner yoke is generated due to the electromagnetic force when driving the PM type stepping motor, vibration and impact sound may not be generated or not easily generated, so that it is possible to obtain a quieter PM type stepping motor.

In particular, it may be possible to reduce the magnetic interference between the stator units, so that it is possible to prevent fluctuation in force and unevenness in rotation attributable thereto. Further, even if a force causing radial vibration of the stator polar teeth is generated, vibration may not be generated, so that it is also possible to restrain the vibration attributable to the force causing radial vibration.

What is claimed is:

1. A PM type stepping motor, comprising:
a rotor in which N and S magnetic pole pairs of permanent magnets are alternately arranged circumferentially on an outer peripheral surface of the rotor at a fixed pitch P1;
a stator surrounding the rotor,
the stator having a stator unit equipped with an outer yoke and an inner yoke, the outer yoke and the inner yoke having comb-teeth-like stator pole teeth in an inner periphery of the outer yoke and the inner yoke,
each of the outer yoke and the inner yoke being equipped with n sets of teeth groups, each set consisting of m stator polar teeth, and the stator polar teeth in the teeth groups having a pitch of P2 and the teeth groups having a pitch of P3, where:

$P2 \neq P1$, $P3 \neq m \cdot P1$, and $P3 \neq m \cdot P2$, with P1, P2 and P3 being electrical angles, and m and n being integers equal to or larger than 2; and
a constraining member provided in an outer periphery in a vicinity of a forward end of the stator polar teeth formed of a non-magnetic material and constraining the stator polar teeth.

2. The PM type stepping motor according to claim 1, the teeth groups of the outer yoke and the inner yoke being set such that an arbitrary one of the teeth groups of the outer yoke overlaps circumeferentially only one of the teeth groups of the inner yoke.

3. The PM type stepping motor according to claim 1, the stator comprising a plurality of stator units stacked together and an axial gap being formed between base portions of the stator polar teeth of the stator units axially adjacent to each other so that the base portions may not come into contact with each other.

4. The PM type stepping motor according to claim 1, the constraining member being a ring.

5. A PM type stepping motor, comprising:
a rotor in which N and S magnetic pole pairs of permanent magnets are alternately arranged circumferentially on an outer peripheral surface of the rotor at a fixed pitch P1; and
a stator surrounding the rotor,
the stator having a stator unit equipped with an outer yoke and an inner yoke, the outer yoke and the inner yoke having comb-teeth-like stator pole teeth in an inner periphery of the outer yoke and the inner yoke,
each of the outer yoke and the inner yoke being equipped with n sets of teeth groups, each set consisting of m stator polar teeth, and the stator polar teeth in the teeth groups having a pitch of P2 and the teeth groups having a pitch of P3, where:

$P2 \neq P1$, $P3 \neq m \cdot P1$, and $P3 \neq m \cdot P2$, with P1, P2 and P3 being electrical angles, and m and n being integers equal to or larger than 2, and where:

$P2 = P1 \{1 \pm i/u\}$, and $P3 = P1 \{m \pm i'/(n \cdot v')\}$, with u being a positive integer, i being a positive integer which is not a multiple of u, i' being a positive integer which is not a multiple of n, and v' being an order of main higher harmonic reduced.

6. The PM type stepping motor according to claim 5, where:

$P2 = P1 \{1 - i/u\}$, and $P3 = P1 \{m + i'/(n \cdot v')\}$; or $P2 = P1 \{1 - i/u\}$, and $P3 = P1 \{m - i'/(n \cdot v')\}$.

7. A PM type stepping motor, comprising:
a rotor in which N and S magnetic pole pairs of permanent magnets are alternately arranged circumferentially on an outer peripheral surface of the rotor at a fixed pitch P1; and
a stator surrounding the rotor,
the stator having a stator unit equipped with an outer yoke and an inner yoke, the outer yoke and the inner yoke having comb-teeth-like stator pole teeth in an inner periphery of the outer yoke and the inner yoke,
each of the outer yoke and the inner yoke being equipped with n sets of teeth groups, each set consisting of m stator polar teeth, and the stator polar teeth in the teeth groups having a pitch of P2 and the teeth groups having a pitch of P3, where:

$P2 \neq P1$, $P3 \neq m \cdot P1$, and $P3 \neq m \cdot P2$, with P1, P2 and P3 being electrical angles, and m and n being integers equal to or larger than 2, and where:

$P2 = P1 \{1 \pm i/(m \cdot v)\}$, and $P3 = P1 \{m \pm i'/(n \cdot v')\}$, with v and v' being degrees of main higher harmonics reduced, i being a positive integer which is not a multiple of m, and i' being a positive integer which is not a multiple of n.

8. The PM type stepping motor according to claim 7, where:

$$P2=P1 \{1-i/(m \cdot v)\}, \text{ and}$$

$$P3=P1 \{m+i'/(n \cdot v')\}; \text{ or}$$

$$P2=P1 \{1-i/(m \cdot v)\}, \text{ and}$$

$$P3=P1 \{m-i'/(n \cdot v')\}.$$

9. A PM type stepping motor, comprising:
a rotor in which N and S magnetic pole pairs of permanent magnets are alternately arranged circumferentially on an outer peripheral surface of the rotor at a fixed pitch P1;
a stator surrounding the rotor,
the stator having a construction in which a plurality of stator units equipped with outer yokes and inner yokes are stacked together, and the outer yokes and the inner yokes having comb-teeth-like stator polar teeth in an inner periphery of the outer yokes and the inner yokes, each of the outer yokes and the inner yokes being equipped with n sets of teeth groups, each set consisting of m stator polar teeth, and the stator polar teeth in the teeth groups having a pitch of P2 and the teeth groups having a pitch of P3,
an axial gap being formed between base portions of the stator polar teeth of axially adjacent stator units so that the base portions do not come into contact with each other; and where $$P2=P1 \{1 \pm i/u\}, \text{ and}$$

$$P3=P1 \{m \pm i'/(n \cdot v')\},$$

with u being a positive integer, i being a positive integer which is not a multiple of u, i' being a positive integer which is not a multiple of n, and v' being an order of main higher harmonic reduced.

10. The PM type stepping motor according to claim 9, further comprising a spacer provided between the stator units axially adjacent to each other, the spacer being in contact with only portions other than the base portions of the stator polar teeth of the stator units to thereby form the axial gap.

11. The PM type stepping motor according to claim 9, the base portions of the stator polar teeth being deformed in a direction away from the base portions of other stator polar teeth axially adjacent thereto to thereby be separated from the base portions of the other stator polar teeth to form the axial gap.

12. A PM type stepping motor, comprising:
a rotor in which N and S magnetic pole pairs of permanent magnets are alternately arranged circumferentially on an outer peripheral surface at a fixed pitch;
a stator surrounding the rotor, the stator having a stator unit equipped with an outer yoke and an inner yoke having comb-teeth-like stator polar teeth in an inner periphery of the outer yoke and the inner yoke; and
a constraining member provided between a vicinity of the forward end of the stator polar teeth and exciting coil formed of a non-magnetic material and constraining the stator polar teeth.

13. The PM type stepping motor according to claim 12, the constraining member comprising a constraining member for constraining the stator polar teeth of the outer yoke and a constraining member for constraining the stator polar teeth of the inner yoke individually provided.

14. The PM type stepping motor according to claim 12, the constraining member having a width such as to cover from a vicinity of a forward end of the stator polar teeth of the outer yoke to a vicinity of a forward end of the stator polar teeth of the inner yoke.

15. A PM type stepping motor, comprising:
a rotor in which N and S magnetic pole pairs of permanent magnets are alternately arranged circumferentially on an outer peripheral surface at a fixed pitch P1;
a stator surrounding the rotor, the stator comprising covers and a stator unit equipped with an outer yoke and an inner yoke being inserted between the covers from an axial direction, and the outer yoke and the inner yoke having comb-teeth-like stator polar teeth in an inner periphery, each of the outer yoke and the inner yoke being equipped with n sets of teeth groups, each set consisting of m stator polar teeth, and the stator polar teeth in the teeth groups having a pitch of P2 and the teeth groups having a pitch of P3, where:
a cover collision preventing structure that prevents collision of the stator polar teeth with the covers; and where $$P2=P1 \{1 \pm i/u\}, \text{ and}$$

$$P3=P1 \{m \pm i'/(n \cdot v')\},$$

with u being a positive integer, i being a positive integer which is not a multiple of u, i' being a positive integer which is not a multiple of n, and v' being an order of main higher harmonic reduced.

16. The PM type stepping motor according to claim 15, the cover collision preventing structure having a construction in which base portions of the stator polar teeth in contact with the covers are connected to the covers.

17. A PM type stepping motor, comprising:
a rotor in which N and S magnetic pole pairs of permanent magnets are alternately arranged circumferentially on an outer peripheral surface at a fixed pitch P1;
a stator surrounding the rotor, the stator having a stator unit equipped with an outer yoke and an inner yoke, and the outer yoke and the inner yoke having comb-teeth-like stator polar teeth in an inner periphery, each of the outer yoke and the inner yoke being equipped with n sets of teeth groups, each set consisting of m stator polar teeth, and the stator polar teeth in the teeth groups having a pitch of P2 and the teeth groups having a pitch of P3,
ribs integrally formed by press molding at base portions of the stator polar teeth; and where $$P2=P1 \{1 \pm i/u\}, \text{ and}$$

$$P3=P1 \{m \pm i'/(n \cdot v')\},$$

with u being a positive integer, i being a positive integer which is not a multiple of u, i' being a positive integer which is not a multiple of n, and v' being an order of main higher harmonic reduced.

18. A PM type stepping motor, comprising:
a rotor in which N and S magnetic pole pairs of permanent magnets are alternately arranged circumferentially on an outer peripheral surface at a fixed pitch;

a stator surrounding the rotor, the rotor having a rotation shaft rotatably supported by members on a stator side at two positions axially separated from each other, the stator having a stator unit equipped with an outer yoke and an inner yoke, and the outer yoke and the inner yoke having comb-teeth-like stator polar teeth in an inner periphery; and rotor side members using elastic members capable of elastic deformation in the axial direction that support two positions axially separated from each other of the rotation shaft of the rotor.

* * * * *